US009093705B2

(12) United States Patent
Xiao et al.

(10) Patent No.: US 9,093,705 B2
(45) Date of Patent: Jul. 28, 2015

(54) POROUS, AMORPHOUS LITHIUM STORAGE MATERIALS AND A METHOD FOR MAKING THE SAME

(71) Applicant: GM Global Technology Operations LLC, Detroit, MI (US)

(72) Inventors: Xingcheng Xiao, Troy, MI (US); Anil K. Sachdev, Rochester Hills, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/837,898

(22) Filed: Mar. 15, 2013

(65) Prior Publication Data

US 2014/0272578 A1    Sep. 18, 2014

(51) Int. Cl.
| H01M 4/38 | (2006.01) |
| C01B 33/021 | (2006.01) |
| H01M 4/134 | (2010.01) |
| H01M 4/1395 | (2010.01) |
| H01M 10/052 | (2010.01) |
| H01M 4/02 | (2006.01) |

(52) U.S. Cl.
CPC ............ H01M 4/386 (2013.01); C01B 33/021 (2013.01); H01M 4/134 (2013.01); H01M 4/1395 (2013.01); H01M 10/052 (2013.01); H01M 2004/021 (2013.01); Y02E 60/122 (2013.01)

(58) Field of Classification Search
CPC .......... C01B 33/021; H01M 2004/021; H01M 10/052; H01M 4/1395; H01M 4/134; H01M 4/386
USPC ......... 429/231.95, 218.1, 313, 231.8; 423/89, 423/348; 29/623.1, 623.5
See application file for complete search history.

(56) References Cited

U.S. PATENT DOCUMENTS

| 2,955,024 | A | * | 10/1960 | Smith ........................... 423/350 |
| 5,421,958 | A | | 6/1995 | Fathauer et al. |
| 6,465,132 | B1 | * | 10/2002 | Jin .............................. 429/231.8 |
| 7,598,003 | B1 | * | 10/2009 | Yoon et al. .................... 429/313 |
| 8,287,772 | B2 | | 10/2012 | Le et al. |
| 2005/0034756 | A1 | * | 2/2005 | Nakajima et al. ............. 136/261 |
| 2006/0003227 | A1 | * | 1/2006 | Aramata et al. ........... 429/218.1 |
| 2006/0046144 | A1 | * | 3/2006 | Obrovac .................. 429/231.95 |
| 2007/0048612 | A1 | * | 3/2007 | Nakajima et al. ........ 429/231.95 |
| 2007/0122702 | A1 | * | 5/2007 | Sung et al. ................. 429/218.1 |
| 2008/0020282 | A1 | * | 1/2008 | Kim et al. .................. 429/231.8 |
| 2009/0162750 | A1 | * | 6/2009 | Kawakami et al. ........ 429/218.1 |
| 2009/0186267 | A1 | | 7/2009 | Tiegs |
| 2011/0318640 | A1 | * | 12/2011 | Sugiura et al. ............. 429/231.8 |
| 2012/0231326 | A1 | | 9/2012 | Biswal et al. |
| 2012/0321949 | A1 | | 12/2012 | Kawakami et al. |

OTHER PUBLICATIONS

Kasavajjula, Uday, et al., "Nano- and bulk-silicon-based insertion anodes for lithium-ion secondary cells", Journal of Power Sources 163, (2007), pp. 1003-1039.

* cited by examiner

*Primary Examiner* — Kenneth Douyette
(74) *Attorney, Agent, or Firm* — Dierker & Associates, P.C.

(57) ABSTRACT

Porous, amorphous lithium storage materials and a method for making these materials are disclosed herein. In an example of the method, composite particles of a lithium storage material in an amorphous phase and a material that is immiscible with the lithium storage material are prepared. Phase separation is induced within the composite particles to precipitate out the amorphous phase lithium storage material and form phase separated composite particles. The immiscible material is chemically etched from the phase separated composite particles to form porous, amorphous lithium storage material particles.

22 Claims, 4 Drawing Sheets

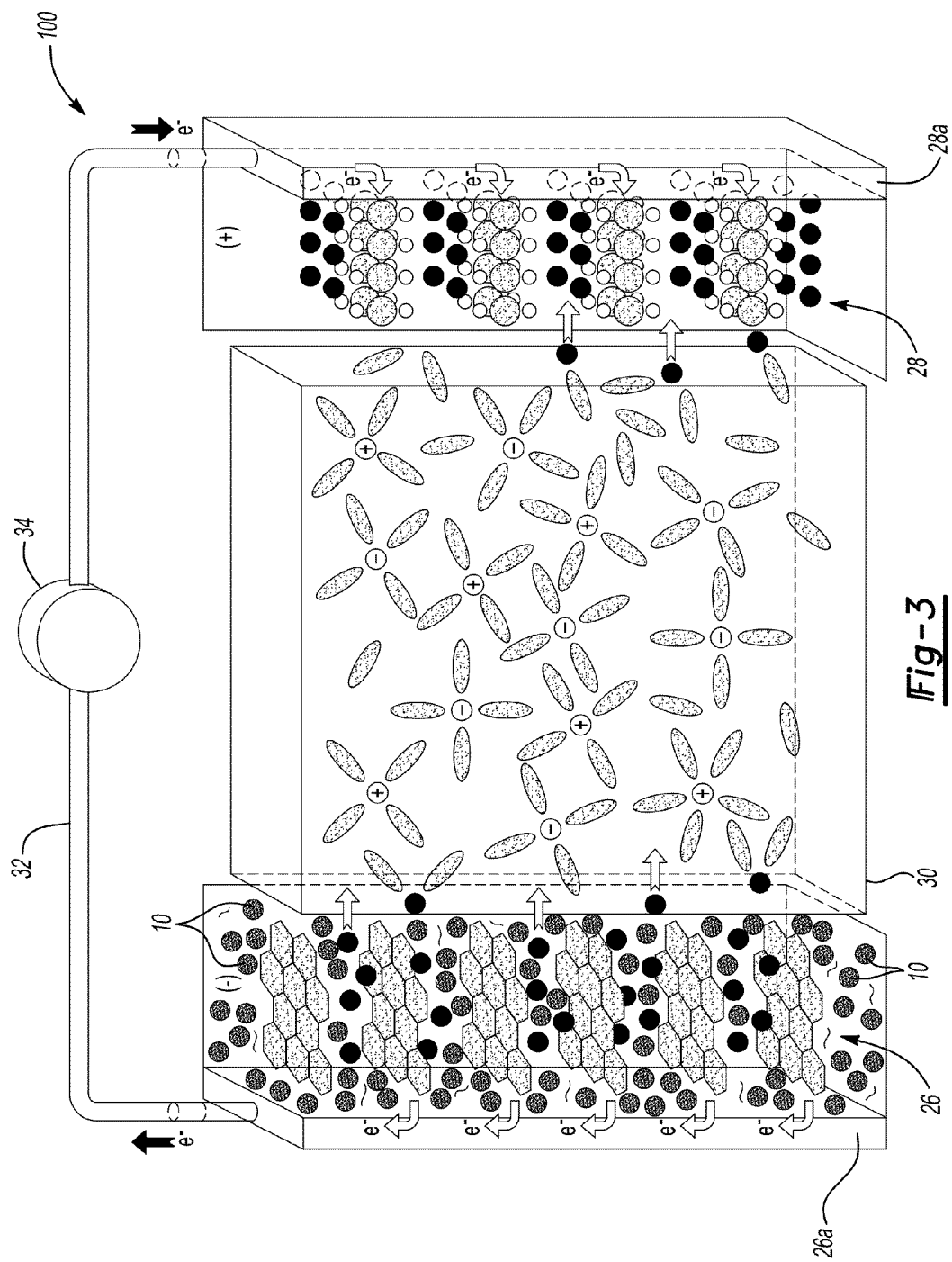

US 9,093,705 B2

POROUS, AMORPHOUS LITHIUM STORAGE MATERIALS AND A METHOD FOR MAKING THE SAME

BACKGROUND

Secondary, or rechargeable, lithium ion batteries are often used in many stationary and portable devices such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium ion batteries to undergo repeated power cycling over their useful lifetimes makes them an attractive and dependable power source.

SUMMARY

Porous, amorphous lithium storage materials and a method for making these materials are disclosed herein. In an example of the method, composite particles of a lithium storage material in an amorphous phase and a material that is immiscible with the lithium storage material are prepared. Phase separation is induced within the composite particles to precipitate out the amorphous phase lithium storage material and form phase separated composite particles. The immiscible material is chemically etched from the phase separated composite particles to form porous, amorphous lithium storage material particles.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a perspective schematic view of an example of a lithium ion battery, including an example of an anode formed with the porous, amorphous lithium storage material particles disclosed herein;

DETAILED DESCRIPTION

The high theoretical capacity (e.g., 4200 mAh/g) of silicon renders it desirable for use as a negative electrode material in lithium ion batteries. However, it has been found that negative electrode materials with high specific capacities also have large volume expansion and contraction during charging/discharging of the lithium ion battery. The large volume change (e.g., about 300%) experienced by the negative electrode material during charging/discharging causes silicon particles (used as at least one negative electrode material) to fracture, decrepitate, or otherwise mechanically degrade, which results in a loss of electrical contact and poor life cycling. The method disclosed herein results in the formation of porous, amorphous lithium storage material particles which have a large surface area (i.e., ≥100 m²/g) and a sufficient amount of free space to accommodate the large volume change during charging/discharging. As such, the method disclosed herein results in lithium storage material particles that are able to accommodate the volume expansion and withstand multiple charging/discharging cycles, thus improving the cycling stability and the life of the lithium ion battery.

Figure 1:
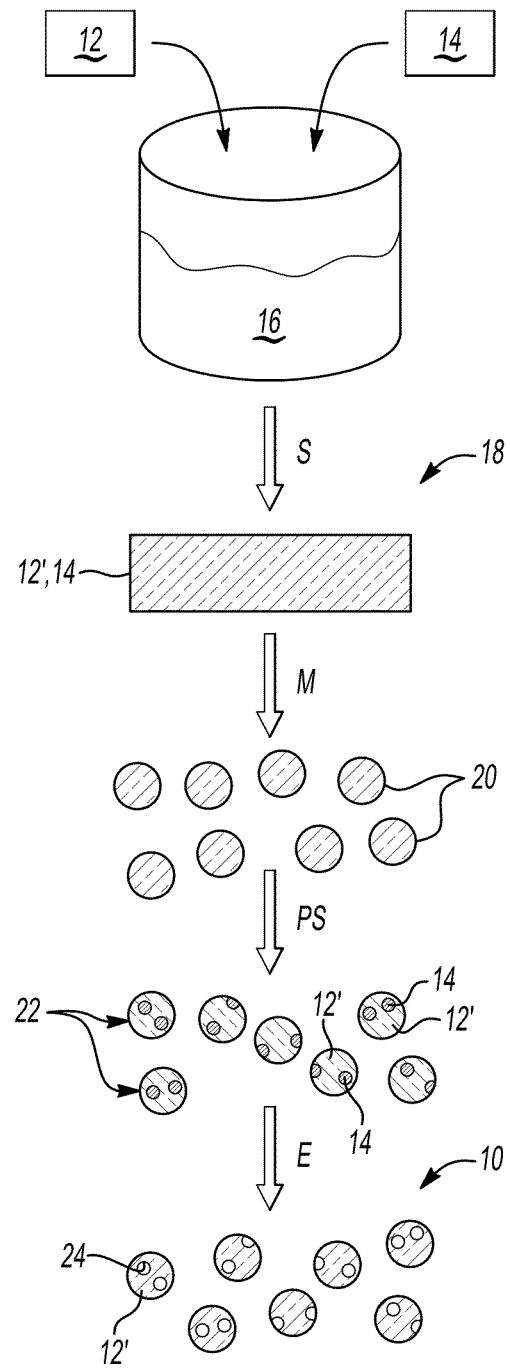
FIG. 1 schematically illustrates an example of a method for making a porous lithium storage material.

Referring now to FIG. 1, an example of a method for making a porous, amorphous lithium storage material is schematically depicted. At the outset, a lithium storage material 12 and a material 14 that is immiscible in the lithium storage material 12 are selected. The lithium storage material 12 may be any material that can sufficiently undergo lithium insertion and deinsertion. Examples of the lithium storage material 12 include silicon and germanium-metal alloys (e.g., Ge—Al alloys, Ge—Ag alloys, and Ge—Sn alloys). The immiscible material 14 may be any material that is immiscible in the selected lithium storage material 12. Examples of the immiscible material 14 include tin (Sn), aluminum (Al), silver (Ag), indium (In), and iron (Fe). In an example, the lithium storage material 12 is silicon and the immiscible material is tin.

The atomic ratio of the lithium storage material 12 and the immiscible material 14 may be varied, depending upon the desired morphology of the resulting porous, amorphous lithium storage material particles. Altering the atomic ratio enables control over the size of the pores that are formed and the framework of the lithium storage material matrix that is formed. In some examples, the atomic ratio of the lithium storage material 12 to the immiscible material 14 is greater than 1. In these examples, an interconnected lithium storage material matrix having a high percolation value is formed, which includes relatively small pores formed therein. In other examples, the atomic ratio of the lithium storage material 12 to the immiscible material 14 is equal to or less than 1. In these other examples, the immiscible material 14 may be beyond the percolation value, which results in larger, more interconnected pores formed among a less stable lithium storage matrix.

The selected lithium storage material 12 and immiscible material 14 are melted together to form a mixture 16, as shown in FIG. 1. The melting temperature will depend upon the melting temperatures of the selected materials 12, 14. As such, the temperature used to form the mixture 16 will be at least the higher melting temperature of the two materials 12, 14. For example, if silicon is selected as the lithium storage material 12 and tin is selected as the immiscible material 14, the temperature for melting the materials will be at least 1414° C., which is the melting point of silicon. Tin will also melt at this temperature because its melting point is 231.9° C. As the materials 12, 14 are melted, they may be stirred to form a substantially homogeneous mixture of the two materials 12, 14.

In one example of the method, a nucleation promoter/additive may be added to the mixture 16. This promoter/additive may be selected to control the precipitation of the immiscible phase during phase separation (discussed below).

More particularly, the selected nucleation promoter/additive may increase the nucleation density of the phase of the immiscible material 14, and thus contribute to a reduction in the pore size and/or the diameter of the porous, amorphous particles that are ultimately formed. Examples of these nucleation promoters/additives include high melting point materials, such as $Si_3N_4$, SiC, WC, MoC, or the like. The nucleation promoters/additives may be in the form of nanopowders having a size (e.g., diameter) below 50 nm. Any suitable amount of the nucleation promoter/additive may be added with a weight ratio below 1%.

The mixture 16 is exposed to a rapid solidification process, shown at "S" in FIG. 1, to form a composite 18. Rapid solidification may be accomplished by cooling the mixture 16 at a rate ranging from about $10^2$K/s to about $10^5$K/s. Cooling may be performed until the composite 18 is formed and has a temperature of about room temperature (e.g., ranging from about 18° C. to about 25° C.). Cooling may be performed using a copper wheel, which rotates at a high speed up to 5,000 rpm. A rotating copper wheel is capable of removing heat very rapidly from the mixture 16. Cooling may also be performed by exposing the mixture 16 to liquid nitrogen, or some other sufficiently cold liquid.

The rapid solidification results in the lithium storage material 12 taking on an amorphous phase. As such, the composite 18 that is formed includes amorphous lithium storage material 12' and the immiscible material 14. While the composite 18 is shown as a layer or film in FIG. 1, the composite 18 may also be in the form of relatively large particles (i.e., >20 μm).

The composite 18 is then exposed to a milling process (shown as "M" in FIG. 1) in order to break up the composite 18 into composite particles 20 having a size ranging from about 100 nm to about 20 μm. When the composite 18 is already in the form of particles (not shown), it is to be understood that the milling process further reduces the size of the particles to form composite particles 20 having a size ranging from about 100 nm to about 20 μm. The composite particles 20 also include the amorphous lithium storage material 12' and the immiscible material 14.

Milling may be accomplished using ball milling, which involves shaking or milling the composite 18 in the presence of beads. When ball milling is utilized and after mixing is accomplished for a suitable amount of time, the beads are removed and the composite particles 20 are formed. In an example, ball milling may be performed for a time ranging from about 10 minutes to about 50 hours. It is to be understood that longer ball milling leads to smaller particles. In an example, ball milling may be carried out in cryo conditions with liquid nitrogen, in order to easily break the larger particles into smaller particles.

Phase separation (shown as "PS" in FIG. 1) of the composite particles 20 is then thermally induced. Upon exposure to annealing (or another suitable heating process), the amorphous lithium storage material 12' will thermodynamically precipitate out from the composite particle 20. Thermally induced phase separation in the examples disclosed herein may be accomplished at a temperature ranging from about 300° C. to about 900° C. The composite particles 20 may be exposed to annealing for a time ranging from about 30 minutes to about 100 hours, and annealing may take place in a vacuum furnace, a vacuum oven, or another suitable heating mechanism. In an example, the annealing also takes place in a protected environment, such as an argon or nitrogen environment.

Phase separation results in the formation of phase separated composite particles, an example of which is shown at reference numeral 22 in FIG. 1. When the atomic ratio of the lithium storage material 12 to the immiscible material 14 used in the mixture 16 is greater than 1, the phase separated composite particles 22 include a matrix of the amorphous phase lithium storage material 12' having the immiscible material 14 embedded therein. These particles are shown in FIG. 1. The pores resulting from these phase separated composite particles 22 will be relatively small and will be surrounded by an interconnected matrix of the amorphous lithium storage material 12'. When the atomic ratio of the lithium storage material 12 to the immiscible material 14 used in the mixture 16 is equal to or less than 1, the phase separated composite particles include a matrix of the immiscible material 14 having the amorphous phase lithium storage material 12' embedded therein. These particles are not shown in FIG. 1. It is to be understood that pores resulting from these phase separated particles will be larger and interconnected.

After phase separation is performed, the phase separated composite particles 22 are exposed to a chemical etching process, as shown at "E" in FIG. 1. Any suitable etchant may be used that will remove the immiscible material 14 while leaving the amorphous lithium storage material 12' substantially unaffected. In an example, chemical etching is performed using an acid, such as hydrochloric acid (HCl), sulfuric acid ($H_2SO_4$), and nitric acid ($HNO_3$). Exposing the phase separated composite particles 22 to the acid removes the immiscible material 14 and forms pores 24 in the amorphous lithium storage material 12'. The pores 24 form in those areas previously occupied by the immiscible material 14. As mentioned above, the size of the pores 24 will depend, at least in part, on the atomic ratio of the lithium storage material 12 to the immiscible material 14. In an example, the size of the pores 24 ranges from about 5 nm to about 1 μm.

Acid exposure and immiscible material 14 removal results in the formation of the porous, amorphous lithium storage material particles 10. These particles 10 may be washed, for example, using deionized water.

The particles 10 include the amorphous lithium storage material 12' as a matrix and pores 24 formed in the matrix. As described herein, in some instances, larger and more interconnected pores may be formed among a matrix of silicon nanoparticles. The average size of the particles 10 ranges from about 100 nm to about 20 μm.

Figure 2:
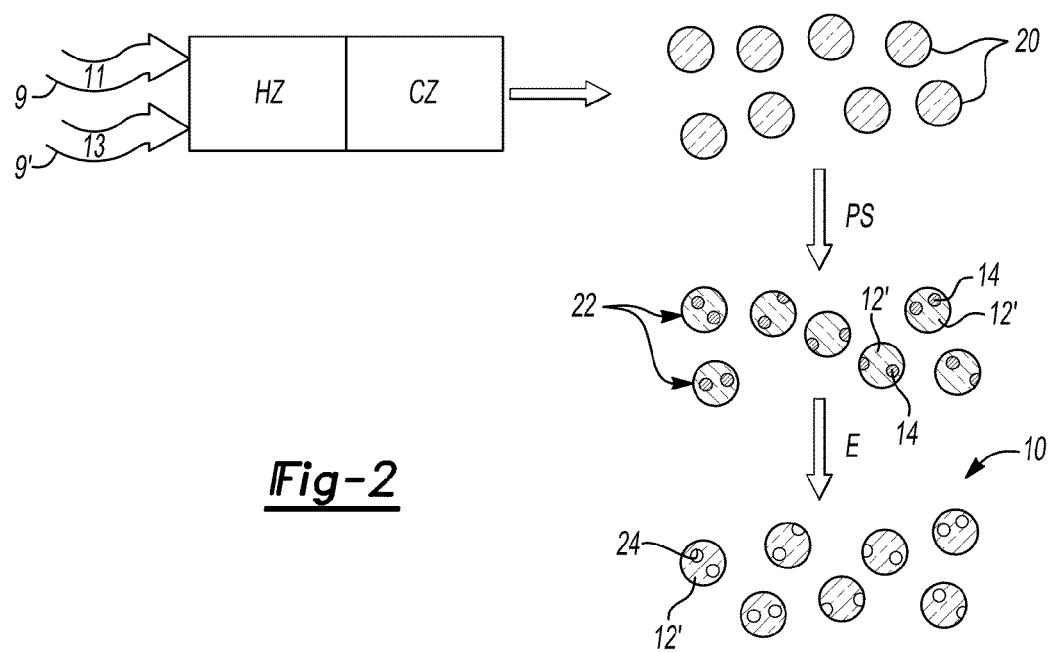
FIG. 2 schematically illustrates another example of a method for making a porous lithium storage material.

Referring now to FIG. 2, another example of a method for making the porous, amorphous lithium storage material is schematically depicted. This example of the method utilizes a chemical vapor condensation method to make the composite particles 20. At the outset, a precursor 11 to the lithium storage material 12 and a precursor 13 to the immiscible material 14 are selected. Precursors 11 may include precursors to silicon or precursors to germanium-metal alloys. Precursors 13 may include precursors to tin (Sn), aluminum (Al), silver (Ag), indium (In), or iron (Fe). Examples of the silicon precursors 11 include 2,4,6,8,10-pentamethylcyclopentasiloxane $(CH_3SiHO)_5$, pentamethyldisilane $(CH_3)_3SiSi(CH_3)_2$H, silicon tetrabromide ($SiBr_4$), silicon tetrachloride ($SiCl_4$), tetraethylsilane $Si(C_2H_5)_4$, and 2,4,6,8-tetramethylcyclotetrasiloxane $(HSiCH_3O)_4$. Examples of the tin precursors 13 include dibutyldiphenyltin $[CH_3(CH_3)_3]_2Sn(C_6H_5)$, hexaphenylditin(IV) $(C_6H_5)_3Sn$, tetraallyltin $(H_2C=CHCH_2)_4Sn$, tetrakis(diethylamido)tin(IV) $[(C_2H_5)_2N]_4Sn$, tetrakis(dimethylamido)tin(IV) $(CH_3)_2N$, tetramethyltin $Sn(CH_3)_4$, tetravinyltin $Sn(CH=CH_2)_4$, tin(II) acetylacetonate $C_{10}H_{14}O_4Sn$, tricyclohexyltin hydride $(C_6H_{11})_3SnH$, trimethyl(phenylethynyl)tin $C_6H_5C\equiv CSn(CH_3)_3$, and trimethyl(phenyl)tin $C_6H_5Sn(CH_3)_3$).

The selected precursors 11 and 13 are delivered via respective carrier gases 9, 9' into a heating zone HZ. An example of a suitable carrier gas 9, 9' includes argon plus about 5% hydrogen gas ($H_2$).

The atomic ratio of the amorphous lithium storage material 12' and the immiscible material 14 in the composite particles 22 may be varied, in this example, by controlling the carrier gas 9, 9' flow rate for the respective precursors 11, 13. A higher flow rate for the carrier gas 9, 9' including one of the precursors 11, 13 will increase the atomic ratio of the corresponding material 12', 14 in the composite particles 22. For example, if a higher flow rate is used for the carrier gas 9 than for the carrier gas 9', more of the lithium storage material precursor 11 will be introduced and the resulting composite particles 22 will include more of the amorphous lithium storage material 12'. The atomic ratio in this example will affect the morphology of the lithium storage material matrix and the size of the pores 24 in a similar manner to what was discussed in reference to FIG. 1.

In the heating zone HZ, the precursors 11, 13 are exposed to a predetermined temperature, which, in an example, is above 1000° C. Within the heating zone HZ, the precursors 11, 13 are reacted with one another to form an alloy vapor of the lithium storage material 12 and the immiscible material 14. In an example, the precursors 11, 13 carried by respective gases 9, 9' are a silicon precursor and a tin precursor. In this example, the alloy vapor formed in the heating zone HZ is a SiSn alloy vapor.

The alloy vapor is then delivered to the cooling zone CZ, which is set to a predetermined temperature. In an example, the predetermined temperature of the cooling zone CZ is below about −20° C. Within the cooling zone CZ, the alloy vapor condenses into the composite particles 20. The cooling zone CZ provides rapid solidification, and the resulting lithium storage material 12' in the composite particles 20 is amorphous. The composite particles 20 may be in powder form.

The composite particles 20 are then subjected to phase separation PS and etching E. These processes may be accomplished as previously described in reference to FIG. 1. These processes result in the formation of the porous, amorphous lithium storage material particles 10.

While not shown in FIG. 1 or 2, the examples of the method may also include applying a passivation layer on a surface of the particles 10. This passivation layer may aid in suppressing decomposition of the electrolyte used in the lithium ion battery, and may prevent lithium loss in the solid electrolyte interphase formed on the pore surface of the lithium storage material particles 10. Examples of the passivation layer include $Al_2O_3$, $SiO_2$, $TiO_2$, $ZrO_2$, $AlF_3$, C, TiN, AlN, ZrN, or other like materials. The passivation layer may be applied using any suitable vapor deposition technique, such as atomic layer deposition (ALD). It is to be understood that the vapor may penetrate into some of the pores 24, and thus the passivation layer may form on the pore 24 surface(s) and also on the particle's exterior surface. The thickness of the passivation layer may be controlled to be under 10 nm so that extra impedance is not introduced into the battery cell(s). It is to be further understood that the passivation layer will not change the morphology of the amorphous lithium storage material particles 10.

The porous, amorphous lithium storage material particles 10 disclosed herein may be used in anodes. These anodes may be particularly suitable for use in lithium ion batteries for the reasons mentioned herein. In an example, the anode includes the porous, amorphous lithium storage material particles 10, sodium alginate, and graphene. The sodium alginate may be used to bind the particles 10 and the graphene together. The graphene may be desirable because it acts as a conductive additive, exhibits favorable lithium insertion and deinsertion characteristics, and can store lithium in quantities that produce a relatively high energy density. Binders other than sodium alginate may be used, including, for example, polyvinylidene fluoride (PVDF), poly(acrylic acid), carboxymethylcellulose, polyacrylonitrile, polyethylene oxide, polyethylene, polypropylene, polytetrafluoroethylene (PTFE), polybutadiene, polystyrene, polyalkyl acrylates and methacrylates, ethylene-(propylene-diene-monomer)-copolymer (EPDM) rubber, copolymers of styrene and butadiene, and mixtures of these polymers. Other conductive additives may be used instead of, or in addition to the graphene. Examples of other suitable conductive additives include carbon black, carbon nanotubes, conductive polymers, or combinations thereof.

In an example, the anode includes from about 30 wt % to about 80 wt % of the particles 10, from about 10 wt % to about 20 wt % of the binder, and from about 10 wt % to about 20 wt % of the conductive additive. In an example, the anode includes about 64 wt % of the particles 10, about 15 wt % of the sodium alginate or other binder(s), and about 21 wt % of the graphene or other conductive additive(s). An example of the anode including the porous, amorphous lithium storage material particles 10 as shown in FIG. 3 at reference numeral 26.

More particularly, FIG. 3 illustrates an example of a secondary lithium ion battery 100. The battery 100 generally includes the anode 26, a cathode 26, a microporous polymer separator 30 sandwiched between the two electrodes 26, 28, and an interruptible external circuit 32 that connects the anode 26 and the cathode 28. Each of the anode 26, the cathode 28, and the microporous polymer separator 30 are soaked in an electrolyte solution capable of conducting lithium ions. The microporous polymer separator 30, which operates as both an electrical insulator and a mechanical support, is sandwiched between the anode 26 and the cathode 28 to prevent physical contact between the two electrodes 26, 28 and the occurrence of a short circuit. The microporous polymer separator 30, in addition to providing a physical barrier between the two electrodes 26, 28, ensures passage of lithium ions (identified by the black dots and by the open circles having a (+) charge in FIG. 3) and related anions (identified by the open circles having a (−) charge in FIG. 3) through the electrolyte solution filling its pores. This helps ensure that the lithium ion battery 100 functions properly. A negative-side current collector 26a and a positive-side current collector 28a may be positioned in contact with the anode 26 and the cathode 28, respectively, to collect and move free electrons to and from the external circuit 32.

The lithium ion battery 100 may support a load device 34 that can be operatively connected to the external circuit 32. The load device 34 may be powered fully or partially by the electric current passing through the external circuit 32 when the lithium ion battery 100 is discharging. While the load device 34 may be any number of known electrically-powered devices, a few specific examples of a power-consuming load device include an electric motor for a hybrid vehicle or an all-electrical vehicle, a laptop computer, a cellular phone, and a cordless power tool. The load device 34 may also, however, be a power-generating apparatus that charges the lithium ion battery 100 for purposes of storing energy. For instance, the tendency of windmills and solar panels to variably and/or intermittently generate electricity often results in a need to store surplus energy for later use.

The lithium ion battery 100 can include a wide range of other components that, while not depicted here, are nonetheless known to skilled artisans. For instance, the lithium ion battery 100 may include a casing, gaskets, terminals, tabs, and any other desirable components or materials that may be situated between or around the anode 26 and the cathode 28 for performance-related or other practical purposes. Moreover, the size and shape of the lithium ion battery 100, as well as the design and chemical make-up of its main components, may vary depending on the particular application for which it is designed. Battery-powered automobiles and hand-held consumer electronic devices, for example, are two instances where the lithium ion battery 100 would most likely be designed to different size, capacity, and power-output specifications. The lithium ion battery 100 may also be connected in series and/or in parallel with other similar lithium ion batteries to produce a greater voltage output and current (if arranged in parallel) or voltage (if arranged in series) if the load device 34 so requires.

The lithium ion battery 100 can generate a useful electric current during battery discharge by way of reversible electrochemical reactions that occur when the external circuit 32 is closed to connect the anode 26 and the cathode 28 at a time when the anode 26 contains a sufficiently higher relative quantity of intercalated lithium. The chemical potential difference between the cathode 28 and the anode 26 (ranging from approximately 2.5 to 5.0 volts, depending on the exact chemical make-up of the electrodes 26, 28) drives electrons produced by the oxidation of intercalated lithium at the anode 26 through the external circuit 32 towards the cathode 28. Lithium ions, which are also produced at the anode 26, are concurrently carried by the electrolyte solution through the microporous polymer separator 30 and towards the cathode 28. The electrons flowing through the external circuit 32 and the lithium ions migrating across the microporous polymer separator 30 in the electrolyte solution eventually reconcile and form intercalated lithium at the cathode 28. The electric current passing through the external circuit 32 can be harnessed and directed through the load device 34 until the intercalated lithium in the anode 26 is depleted and the capacity of the lithium ion battery 100 is diminished.

The lithium ion battery 100 can be charged or re-powered at any time by applying an external power source to the lithium ion battery 100 to reverse the electrochemical reactions that occur during battery discharge. The connection of an external power source to the lithium ion battery 100 compels the otherwise non-spontaneous oxidation of intercalated lithium at the cathode 28 to produce electrons and lithium ions. The electrons, which flow back towards the anode 26 through the external circuit 32, and the lithium ions, which are carried by the electrolyte across the microporous polymer separator 30 back towards the anode 26, reunite at the anode 26 and replenish it with intercalated lithium for consumption during the next battery discharge cycle. The external power source that may be used to charge the lithium ion battery 100 may vary depending on the size, construction, and particular end-use of the lithium ion battery 100. Some suitable external power sources include a battery charger plugged into an AC wall outlet and a motor vehicle alternator.

As mentioned above, the anode 26 includes the porous, amorphous lithium storage material particles 10. These particles 10 are the lithium host material that can sufficiently undergo lithium insertion and deinsertion while functioning as the negative terminal of the lithium ion battery 100. The anode 26 may also include a binder material to structurally hold the porous, amorphous lithium storage material particles 10 together, and an electron conduction material (i.e., conductive additive), such as the previously mentioned graphene.

The negative-side current collector 26a may be formed from copper or any other appropriate electrically conductive material known to skilled artisans.

The cathode 28 may be formed from any lithium-based active material that can sufficiently undergo lithium insertion and deinsertion while functioning as the positive terminal of the lithium ion battery 100. The cathode 28 may also include a polymer binder material to structurally hold the lithium-based active material together. One common class of known materials that can be used to form the cathode 28 is layered lithium transitional metal oxides. In various examples, the cathode 28 may include an active material intermingled with a polymeric binder and mixed with a high surface area carbon, such as acetylene black, to ensure electron conduction between the current collector 28a and the active material particles of the cathode 28. The active material may be made of at least one of spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). The polymeric binder may be made of at least one of polyvinylidene fluoride (PVdF), an ethylene propylene diene monomer (EPDM) rubber, or carboxymethyl cellulose (CMC)). Other lithium-based active materials may also be utilized besides those just mentioned. Examples of those alternative materials include lithium nickel-cobalt oxide ($LiNi_xCo_{1-x}O_2$), aluminum stabilized lithium manganese oxide spinel ($Li_xMn_{2-x}Al_yO_4$), and lithium vanadium oxide ($LiV_2O_5$). The positive-side current collector 28a may be formed from aluminum or any other appropriate electrically conductive material known to skilled artisans.

Any appropriate electrolyte solution that can conduct lithium ions between the anode 26 and cathode 28 may be used in the lithium ion battery 100. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 100 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiAsF_6$, $LiPF_6$, and mixtures thereof. These and other similar lithium salts may be dissolved in a variety of organic solvents such as cyclic carbonates (ethylene carbonate, propylene carbonate, butylene carbonate), linear carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 30 includes, or in some examples, is a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP.

In another example, the membrane of the microporous polymer separator 30 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 30 is poly(p-hydroxybenzoic acid).

In yet another example, the membrane of the microporous separator 30 may be chosen from a combination of the polyolefin (such as PE and/or PP) and one or more of the polymers for the separator 30 listed above.

The microporous polymer separator 30 may contain a single layer or a multi-layer laminate fabricated from either a dry or wet process. For example, in one example, a single layer of the polyolefin may constitute the entirety of the microporous polymer separator 30 membrane. In another example, a single layer of one or a combination of any of the polymers from which the microporous polymer separator 30 may be formed (e.g., the polyolefin and/or one or more of the other polymers listed above for the separator 30) may constitute the entirety of the separator 30. As another example, however, multiple discrete layers of similar or dissimilar polyolefins and/or polymers for the separator 30 may be assembled into the microporous polymer separator 30. In one example, a discrete layer of one or more of the polymers may be coated on a discrete layer of the polyolefin for the separator 30. Further, the polyolefin (and/or other polymer) layer, and any other optional polymer layers, may further be included in the microporous polymer separator 30 as a fibrous layer to help provide the microporous polymer separator 30 with appropriate structural and porosity characteristics. A more complete discussion of single and multi-layer lithium ion battery separators, and the dry and wet processes that may be used to make them, can be found in P. Arora and Z. Zhang, "Battery Separators," Chem. Rev., 104, 4424-4427 (2004).

Still other suitable polymer separators 30 include those that have a ceramic layer attached thereto, and those that have ceramic filler in the polymer matrix (i.e., an organic-inorganic composite matrix).

To further illustrate the present disclosure, examples are given herein. It is to be understood that these examples are provided for illustrative purposes and are not to be construed as limiting the scope of the disclosed example(s).

Example 1

Figure 4:
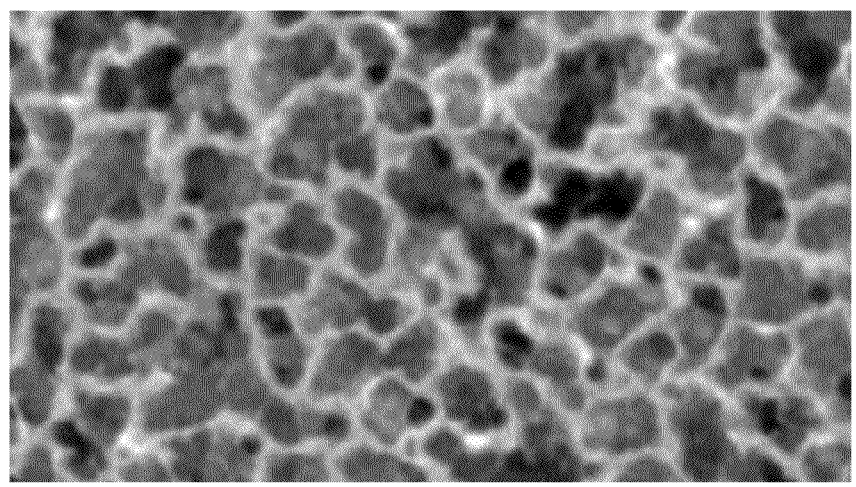
FIG. 4 is a scanning electron micrograph (SEM) of a phase separated composite material including tin and amorphous silicon.

To test the phase separation of silicon and tin, a thin film of SiSn was formed using a sputtering technique. In particular, silicon and tin were co-deposited as a composite thin film in a Gamma 1000 sputtering system. During sputtering, the amorphous silicon and tin phase segregated, resulting in phase separated regions of pure amorphous silicon and pure tin. A SEM of the phase separated thin film is shown in FIG. 4. Silicon is the darker phase and tin is the brighter phase.

Example 2

Figure 5:
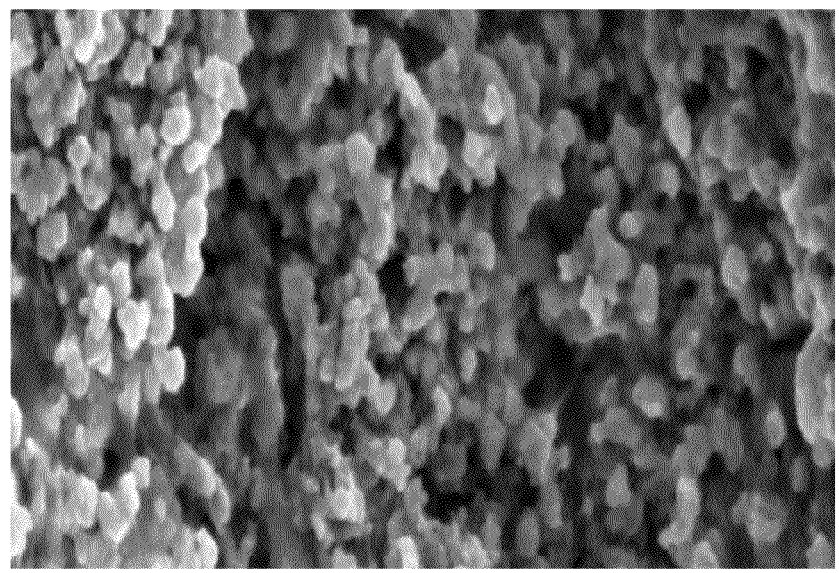
FIG. 5 is a SEM of amorphous, porous silicon that is formed by an example of the method disclosed herein using an atomic ratio of $Si_{75}$:$Sn_{25}$.

Porous, amorphous silicon particles were formed via the method disclosed herein. Silicon and tin present in an atomic ratio of 75:25 were melted together. The mixture was rapidly solidified using melt spinning to form an amorphous silicon/tin composite, and this composite was subjected to ball milling to form amorphous silicon/tin composite particles. The amorphous silicon/tin composite particles were subjected to annealing to phase separate the amorphous silicon from the tin. Etching was performed with a 1M HCl solution in order to remove the tin from the amorphous silicon. This formed amorphous, porous silicon particles. A SEM of one amorphous, porous silicon particle is shown in FIG. 5. This figure (from left to right across the page) is about 2,000 nm (i.e., 2 μm) of the porous silicon particle. The darker areas in FIG. 5 are pores that were formed within the silicon matrix.

The cycling performance of the amorphous, porous silicon particles was tested and compared to the cycling performance of comparative amorphous silicon/tin particles (i.e., particles that were not exposed to the etching step). Electrodes were made using the amorphous, porous silicon particles and the comparative amorphous silicon/tin particles. The electrode including the amorphous, porous silicon particles is referred to as "Sample Electrode" and the comparative electrode including the amorphous silicon/tin particles is referred to as "Comparative Electrode".

Figure 6:
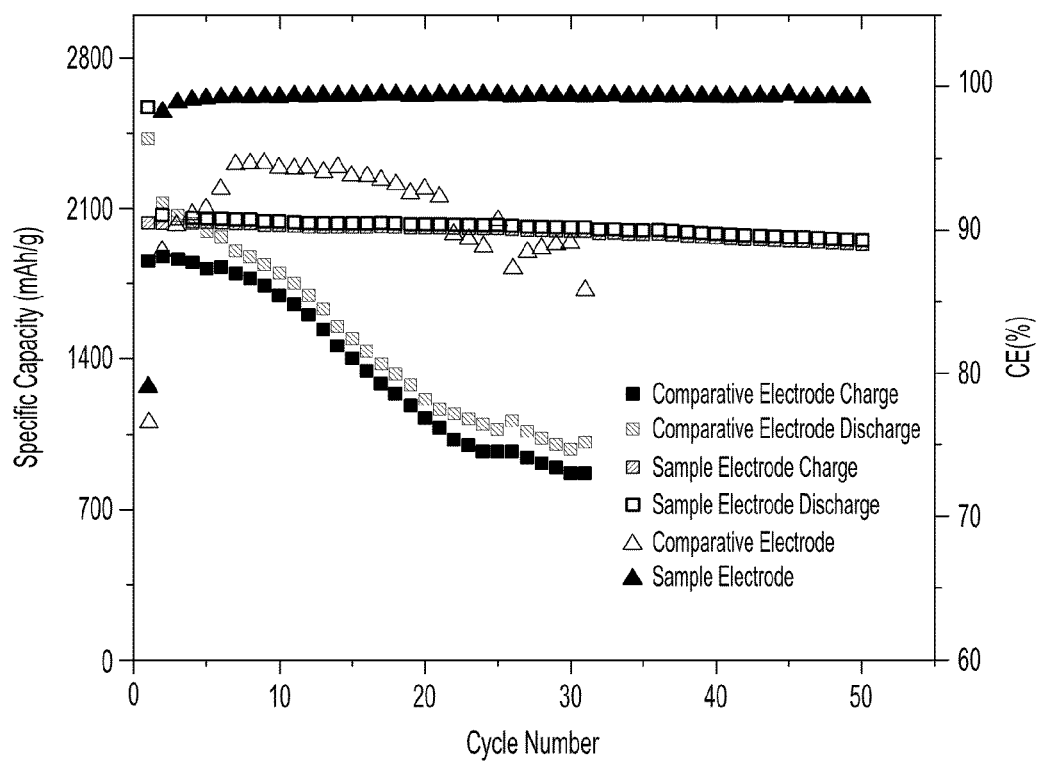
FIG. 6 is a graph exhibiting the specific capacity and the current efficiency (CE) of an electrode including amorphous, porous silicon particles and a comparative electrode including amorphous silicon/tin particles.

The galvanostatic cycling performance of Sample Electrode and Comparative Electrode was tested in 1M $LiPF_6$ (ethylene carbonate:dimethyl carbonate (EC:DEC) 1:1) plus 10 wt % fluorinated ethylene carbonate (FEC) at 30° C. Sample Electrode and Comparative Electrode were evaluated using coin cells with a metallic Li under the following test conditions: 0.1 C and 1.5V to 0.05V up to 50 cycles. These results are shown in FIG. 6. The specific capacity results for Sample Electrode are relatively consistent for both charge and discharge over the various cycles, and are significantly improved compared to the specific capacity results for Comparative Electrode. As such, the electrode including the amorphous, porous silicon particles disclosed herein exhibited improved cycling stability.

The current efficiency of Sample Electrode and Comparative Electrode was also calculated based upon the ratio between charge and discharge capacity. These results are also shown in FIG. 6. As illustrated, the current efficiency results for Sample Electrode are much higher than the current efficiency results for Comparative Electrode. As such, the Sample Electrode including the amorphous, porous silicon particles disclosed herein exhibited improved current efficiency.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 100 nm to about 20 μm should be interpreted to include not only the explicitly recited limits of about 100 nm to about 20 μm, but also to include individual values, such as 500 nm, 1.5 μm, 12 μm, etc., and sub-ranges, such as from about 325 nm to about 15 μm; from about 750 nm to about 10 μm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for making a porous, amorphous lithium storage material, comprising:
   selecting a lithium storage material from the group consisting of silicon and germanium-metal alloys;
   selecting a material that is immiscible with the lithium storage material from the group consisting of tin, aluminum, silver, indium, and iron;
   preparing composite particles of the lithium storage material in an amorphous phase and the immiscible material;
   inducing phase separation within the composite particles to precipitate out the amorphous phase lithium storage material and form phase separated composite particles; and
   chemically etching the immiscible material from the phase separated composite particles, thereby forming porous, amorphous lithium storage material particles, wherein the chemically etching is accomplished using an acid selected from the group consisting of hydrochloric acid, sulfuric acid, and nitric acid.

2. The method as defined in claim 1 wherein the preparing of the composite particles includes:
   melting the lithium storage material and the immiscible material together to form a mixture;
   solidifying the mixture to form a composite including the lithium storage material in the amorphous phase; and
   milling the composite to form the composite particles.

3. The method as defined in claim 2 wherein the solidifying of the mixture is accomplished by cooling the mixture at a rate ranging from about $10^2$ K/s to about $10^5$ K/s.

4. The method as defined in claim 2 wherein the milling is accomplished using cryo ball milling to reduce a size of the composite particles to below 20 μm.

5. The method as defined in claim 2, further comprising adding a nucleation additive to the mixture to control a size of pores formed in the porous lithium storage material particles, wherein the nucleation additive increases a nucleation density of a phase of the immiscible material and thus reduces the size of the pores formed in the porous lithium storage material particles.

6. The method as defined in claim 1 wherein the inducing of phase separation is accomplished by annealing the composite particles at a temperature ranging from about 300° C. to about 900° C.

7. The method as defined in claim 1, further comprising applying a passivation layer on a surface of the porous, amorphous lithium storage material particles.

8. The method as defined in claim 5 wherein the nucleation additive is selected from the group consisting of $Si_3N_4$, SiC, WC, and MoC.

9. A method for making a porous, amorphous lithium storage material, comprising:
   preparing composite particles of a lithium storage material in an amorphous phase and a material that is immiscible with the lithium storage material by:
      melting the lithium storage material and the immiscible material together to form a mixture;
      solidifying the mixture to form a composite including the lithium storage material in the amorphous phase; and
      milling the composite to form the composite particles;
   inducing phase separation within the composite particles to precipitate out the amorphous phase lithium storage material and form phase separated composite particles;
   chemically etching the immiscible material from the phase separated composite particles, thereby forming porous, amorphous lithium storage material particles; and
   tailoring a size of pores formed in the porous, amorphous lithium storage material particles by controlling an atomic ratio of the lithium storage material to the immiscible material used to form the mixture.

10. The method as defined in claim 9, further comprising controlling the atomic ratio of the lithium storage material to the immiscible material to be greater than 1, whereby the phase separated composite particles include a matrix of the amorphous phase lithium storage material having the immiscible material embedded therein.

11. The method as defined in claim 9, further comprising controlling the atomic ratio of the lithium storage material to the immiscible material to be equal to or less than 1, whereby the phase separated composite particles include a matrix of the immiscible material having the amorphous phase lithium storage material embedded therein.

12. The method as defined in claim 9, further comprising:
   selecting the lithium storage material from the group consisting of silicon and germanium-metal alloys; and
   selecting the immiscible material from the group consisting of tin, aluminum, silver, indium, and iron.

13. The method as defined in claim 9 wherein the chemically etching is accomplished using an acid selected from the group consisting of hydrochloric acid, sulfuric acid, and nitric acid.

14. The method as defined in claim 9 wherein the solidifying of the mixture is accomplished by cooling the mixture at a rate ranging from about $10^2$ K/s to about $10^5$ K/s.

15. The method as defined in claim 9 wherein the milling is accomplished using cryo ball milling to reduce a size of the composite particles to below 20 μm.

16. The method as defined in claim 9 wherein the inducing of phase separation is accomplished by annealing the composite particles at a temperature ranging from about 300° C. to about 900° C.

17. A method for making a porous, amorphous lithium storage material, comprising:
   preparing composite particles of a lithium storage material in an amorphous phase and a material that is immiscible with the lithium storage material, wherein the preparing of the composite particles includes:
      delivering a first carrier gas including a lithium storage material precursor and a second carrier gas including an immiscible material precursor to a heating zone having a predetermined temperature, thereby forming an alloy vapor of the lithium storage material and the immiscible material; and delivering the alloy vapor to a cooling zone having a predetermined temperature, thereby forming the composite particles;

inducing phase separation within the composite particles to precipitate out the amorphous phase lithium storage material and form phase separated composite particles; and chemically etching the immiscible material from the phase separated composite particles, thereby forming porous, amorphous lithium storage material particles.

18. The method as defined in claim 17 wherein:
the lithium storage material precursor is a silicon precursor;
the immiscible material precursor is a tin precursor;
the predetermined temperature of the heating zone is above 1000° C.; and
the predetermined temperature of the cooling zone is below −20° C.

19. The method as defined in claim 17, further comprising controlling a flow rate of at least one of the first carrier gas and the second carrier gas, thereby controlling an atomic ratio of the lithium storage material to the immiscible material in the composite particles.

20. The method as defined in claim 17 wherein the chemically etching is accomplished using an acid selected from the group consisting of hydrochloric acid, sulfuric acid, and nitric acid.

21. The method as defined in claim 17 wherein the inducing of phase separation is accomplished by annealing the composite particles at a temperature ranging from about 300° C. to about 900° C.

22. The method as defined in claim 19 wherein the controlling of the flow rate includes selecting a higher flow rate for the first carrier gas to increase the atomic ratio of the lithium storage material to the immiscible material.

* * * * *